United States Patent [19]
Nield et al.

[11] Patent Number: 5,543,445
[45] Date of Patent: Aug. 6, 1996

[54] AQUEOUS COATING COMPOSITION

[75] Inventors: Eric Nield, Royston; Peter D. Palasz, Taplow, both of United Kingdom

[73] Assignee: Imperial Chemical Industries PLC, London, England

[21] Appl. No.: 360,925

[22] Filed: Dec. 21, 1994

[30] Foreign Application Priority Data

Dec. 21, 1993 [GB] United Kingdom .................. 9326032

[51] Int. Cl.$^6$ .............................. C08K 3/20; C08L 63/02
[52] U.S. Cl. ........................................ 523/406; 523/407
[58] Field of Search ..................... 523/406, 407

[56] References Cited

U.S. PATENT DOCUMENTS 3,166,527  1/1965  Ender ..................... 525/476
4,614,766  9/1986  Schimmel et al. .
5,118,752  6/1992  Chang et al. .

FOREIGN PATENT DOCUMENTS 0216320  1/1987  European Pat. Off. .
5295080  11/1993  Japan .

*Primary Examiner*—Melvyn I. Marquis
*Assistant Examiner*—D. Aylward
*Attorney, Agent, or Firm*—Cushman Darby & Cushman, LLP

[57] ABSTRACT

A coating composition which comprises a dispersion in an aqueous medium of a dispersed vinyl polymer which is stabilized in dispersion by the presence of a stabilizer which is an epoxy resin, which has at least two hydrolyzable silane groups and at least one protonated or quaternised amine group.

11 Claims, No Drawings

AQUEOUS COATING COMPOSITION

This invention relates to coating compositions comprising aqueous vinyl polymer dispersions, to a process for their preparation and to their use in a coating process. It also relates to coated substrates obtainable by the coating process.

Aqueous dispersions of vinyl polymers are well known and are commonly used as the basis of coating compositions. Such aqueous dispersions comprise small particles or droplets of vinyl polymer which are held in dispersion in an aqueous medium by a dispersion stabiliser. The polymer is derived from ethylenically unsaturated acrylic or vinyl monomers by free radical polymerisation. The dispersion stabiliser has a hydrophillic component and a component which is either adsorbed onto, or which is covalently bonded to, the vinyl polymer.

One specific type of aqueous vinyl polymer dispersion is disclosed in U.S. Pat. No. 5,118,752. This patent discloses the use of certain specific stabilisers which have hydrophobic and hydrophillic moieties, silicon moieties and amido functionality. These stabilisers are made by the reaction of polyisocyanates with acid functional diols and aminosilanes.

One problem with these dispersions is that they are not stable for long periods. This means that the film-forming ability of these dispersions deteriorates during storage. In particular, the properties of films formed from these compositions, such as water resistance, after the compositions have been stored for three months are poorer than those of films formed from freshly prepared compositions. This is clearly unacceptable in many areas of the coatings industry where paints are often required to be storage stable for six months or more.

Not only that, but stabilisers derived from polyurethane polymers such as those in U.S. Pat. No. 5 118 752 are expensive in relation to the cost of the acrylic polymer and so add considerably to the overall cost of the polymer dispersion.

We have now found that vinyl polymer dispersions can be stabilised by certain stabilisers based on epoxy resins, which have hydrolysable silane groups and cationic hydrophillic groups. These dispersions have improved long term stability, while the stabiliser is economical to use in comparison with polyurethane-derived stabilisers. The dispersions also form films having good early water resistance.

According to the present invention there is provided a coating composition which comprises a dispersion in an aqueous medium of a dispersed vinyl polymer which is stabilised in dispersion by the presence of a stabiliser which is an epoxy resin, which has at least two hydrolysable silane groups and at least one protonated or quaternised amine group.

The use of these particular stabilisers has the benefit that the stabiliser itself is reactive through the hydrolysable silane groups. During film formation these hydrolysable silane groups can react with each other to form Si—O—Si bonds, so crosslinking the film and improving the film properties. The silane groups can also react with any hydrolysable silane groups or hydroxyl groups on the dispersed polymer to give further crosslinking in the final film. This means that the water resistance of the final films is very good.

The aqueous medium is one which does not dissolve the vinyl polymer. The medium can be water or a mixture of water and water miscible organic solvents. Preferably the aqueous medium contains at least 50% by weight of water, more preferably at least 80% and most preferably at least 90%, with the remainder being one or more water miscible organic solvents. The coating compositions preferably contains as little organic solvents as possible in order to reduce pollution.

Water miscible organic solvents which can be present are those which form a true solution in water at the level at which they are used. Examples of suitable organic solvents are glycol ethers such as propylene glycol monomethyl ether (available under the trademark Dowanol PM from Dow Chemicals), ethylene glycol monobutyl ether (available under the trade mark Butyl Cellosolve from Union Carbide), $C_{1-4}$ alkyl alcohols such as methanol, ethanol, propan-1-ol and butan-1-ol and N-methyl pyrrolidone. Propylene glycol monomethyl ether is preferred.

The dispersed vinyl polymer is a polymer which is insoluble in the aqueous medium and which is made up of units derived from ethylenically unsaturated monomers by free radical addition polymerisation. The monomers from which the units can be derived include acrylic and vinyl monomers. In describing acrylic monomers in this specification, the nomenclature "(meth)acrylate" will be used to indicate that the acrylate or methacrylate can be used. The units can comprise structural units and functional units.

Functional units are derived from monomers having functional groups. Examples of suitable functional groups are hydroxyl groups, amine groups, epoxy groups and silane groups. Examples of monomers having hydroxyl groups are hydroxy alkyl (meth)acrylates, particularly hydroxy $C_{2-4}$ (meth)acrylates such as hydroxyethyl (meth)acrylate, hydroxypropyl (meth)acrylate and hydroxybutyl (meth)acrylate. Examples of monomers having amine groups are 2-aminoethylmethacrylate, dimethylamino ethyl (meth)acrylate and dimethylamino propyl (meth)acrylate. Examples of monomers having an epoxy group are glycidyl (meth)acrylate. Examples of monomers having silane groups are 3(trimethoxy silyl) propyl methacrylate, 3(triethoxysilyl)propyl methacrylate, 3(dimethoxymethylsilyl)propyl methacrylate 2(3-cyclohexenyl)ethyl triethoxy silane and vinyl triethoxy silane or partially or fully hydrolysed derivatives of these.

While it is not essential for the dispersed vinyl polymer to contain functional units, the presence of such units can improve the final film properties of the compositions by giving rise to a crosslinked film. For example, hydroxyl groups or hydrolysable silane groups on the dispersed vinyl polymer can react with the silane groups on the stabiliser. Structural units are derived from monomers having no reactive groups. Examples of monomers having no reactive groups are alkyl (meth)acrylates, particularly $C_{1-12}$ alkyl (meth)acrylates such as methyl (meth)acrylate, ethyl (meth)acrylate, n-propyl and iso-propyl (meth)acrylates, n-butyl iso-butyl and t-butyl (meth)acrylates, 2-ethylhexyl acrylate and isobornyl methacrylate, and vinyl monomers such as styrene, methyl styrene, vinyl versatare and vinyl acetate.

The dispersed vinyl polymer can also comprise a proportion of units derived from monomers having more than one ethylenic unsaturation such as allyl methacrylate or divinyl benzene. This introduces a degree of internal crosslinking into the polymer particles.

Hydrolysable silane groups are silicon atoms carrying one or more hydroxyl groups or groups which can hydrolyse to a hydroxyl group in the presence of water.

Preferred hydrolysable silane groups are of the formula;

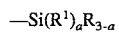

in which a is 1 to 3, preferably 2 or 3. R is independently $C_{1-6}$ alkyl, preferably $C_{1-3}$ alkyl, most preferably methyl or ethyl, and $R^1$ is OH or a hydrolysable group. Examples of suitable hydrolysable groups are alkoxy groups, particularly $C_{1-6}$ alkoxy groups, such as methoxy and ethoxy, alkanoate groups, particularly $C_{2-6}$ alkanoate groups such as ethanoate, or oximes.

Preferably the protonated or quaternised amine group is a protonated tertiary amine group.

The stabiliser is an epoxy resin. The term "epoxy resin" does not necessarily indicate that the resin must be epoxy functional but that it is derived from an epoxy functional resin.

Useful epoxy resins are the reaction products of an epoxy functional resin with a compound having an amine group and a compound having a hydrolysable silane group. The compound having an amine group and the compound having a hydrolysable silane group can be the same compound.

The epoxy functional resins have an average epoxy functionality of at least 1.5, preferably at least 1.8, and most preferably between 1.8 and 5.

Suitable epoxy functional resins have epoxy equivalent weights of less than 2000, preferably less than 500, most preferably less than 250. The lower limit on epoxy equivalent weight is less important but the epoxy functional resins generally have an epoxy equivalent weight of more than 150 and preferably above 180.

One suitable class of epoxy functional resins are those prepared by reacting an epihalohydrin, such as epichlorhydrin, with a dihydroxy phenolic compound such as bis(4-hydroxy phenyl)methane (known as bisphenol F) or 2,2-bis(4-hydroxy phenyl)propane (known as bisphenol A). Many such epoxy functional resins are commercially available in a range of epoxy equivalent weights, for example under the trademark EPIKOTE from Shell Chemicals Limited. These epoxy functional resins have the general formula;

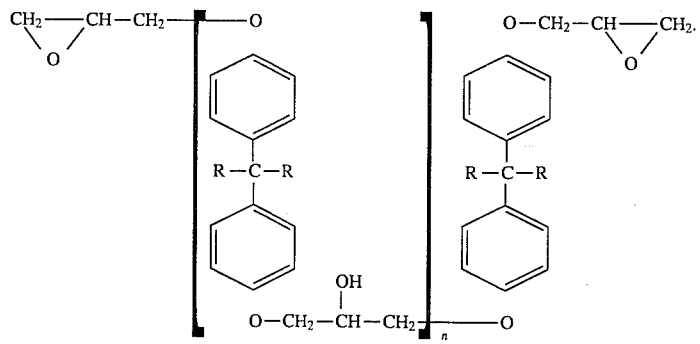

Where R is H or alkyl, preferably methyl and n is preferably 0 to 3 and can on average be non-integral, e.g. 1.2. More preferably n is 0 to 1 and most preferably about 0. An epoxy functional resin of this formula in which n is about 0 is available as Epikote 880 (epoxy equivalent weight 192), and in which n is about 1 as Epikote 1001 (epoxy equivalent weight 475) both from Shell Chemicals.

Other less preferred but still useful epoxy functional resins include extended epoxy functional resins, glycidyl derivatives of terephthalic acid, isocyanurates, sorbitol and novolac resins. Extended epoxy functional resins comprise the epoxy functional reaction product of an epoxy functional resin as described above with a chain extender such as a diol or a diamine.

One other class of epoxy functional resins are epoxy functional acrylic resins. Epoxy functional acrylic resins comprise structural units and epoxy functional units. The structural units are derived from monomers having no reactive groups. The monomers having no reactive groups can be any of those monomers mentioned above in relation to the structural units of the dispersed acrylic polymer.

The epoxy functional units are derived from monomers which have an epoxy group such as glycidyl (meth)acrylate. The number average molecular weight of the epoxy functional acrylic resin is less than 30000 and preferably from 3000 to 5000 as measured by gel permeation chromatography.

Preferably the stabiliser is the protonated or quaternised reaction product of the epoxy functional resin with a compound having both an amino group and a hydrolysable silane group, often referred to an aminosilane. Examples of suitable aminosilanes are primary-aminosilanes such as gamma-aminopropyl trimethoxy silane, gamma-aminopropyl methyl dimethoxy silane and secondary-amino silanes such as N-methyl gamma aminopropyl trimethoxy silane or bis-gamma-aminopropyl triethoxysilane, or partially or fully hydrolysed derivatives of these. Secondary-aminosilanes are preferred because these give rise to fewer unwanted side reactions when reacted with the epoxy functional resin. The use of secondary-aminosilanes gives rise to tertiary amine groups in the stabiliser.

The epoxy functional resin can also be reacted with a proportion of a thiosilane such as 3-mercapto propyl trimethoxy silane as well as with the aminosilane.

Preferably the stabiliser is soluble in the aqueous medium. This means that the dispersion can be made by an emulsion polymerisation process as described below. Soluble means that a sample of 15 milligrammes of the Stabiliser in 4.5 g of water gives no particle size reading on a particle size analyzer such as a Malvern Autosizer 2c.

The dispersion stabiliser is preferably present in an amount of at least 1% by weight based on the total weight of the polymer dispersion including the stabiliser, more preferably at least 4% and most preferably at least 12%. The maximum amount of stabiliser is less important because the stabiliser itself forms a crosslinked film due to reaction between the silane groups. However a preferred maximum is 50% by weight based on the total amount of dispersed polymer including the stabiliser.

Preferably a proportion of the stabiliser is covalently bonded onto the dispersed vinyl polymer. More preferably this proportion is grafted onto the polymer. This means that some of the stabiliser is covalently bonded to the polymer via a carbon-carbon bond by grafting during the polymerisation process leading to the formation of the polymer.

Grafting occurs during the polymerisation process by hydrogen radical abstraction from a graftable group. Graftable groups are groups which can form free radicals on a carbon atom by abstraction of a hydrogen radical in the presence of a grafting initiator. Typically the graftable group comprises a moiety having a carbon atom carrying a hydrogen atom and also bonded to a hetero atom or which is adjacent to a carbon-carbon double bond. Examples of such moieties are of the formula;

in which x is a hetero atom such as O, S or N or is a carbon-carbon double bond C=C. Preferably the group X is an alkoxy, thioalkyl, or amine group.

The proportion of the stabiliser which is covalently bonded onto the polymer is an amount which is sufficient to maintain the polymer in aqueous dispersion. Preferably between 10 and 60% and more preferably between 20 and 50% by weight of the stabiliser is bonded onto the polymer.

The amount of covalently bonded stabiliser can be measured by centrifuging the final polymer dispersion at 13000 rpm for 24 hours at 5° C. so as to effectively precipitate out all of the dispersed polymer together with the bonded stabiliser. This leaves any unbound stabiliser in the supernatant liquid. The amount of stabiliser in the supernatant liquid can be determined by a solids content analysis and the amount of bonded stabiliser calculated by simple subtraction. The solids content of the supernatant liquid can be determined by heating a sample of the liquid to 150° C. for 1 hour and weighing the residue.

The presence of unbound stabiliser is not detrimental to the properties of the final films, and indeed can be beneficial in crosslinking the final film, particularly where the unbound stabiliser is soluble in the aqueous medium. Thus, unlike conventional dispersion stabilisers, one can generally include an excess of stabiliser so as to ensure fine dispersions with good stability without excess stabiliser causing problems with poor final film properties.

The polymer dispersion can also contain other dispersion stabilisers which do not have hydrolysable silane groups. Examples of these stabilisers include conventional cationic and non-ionic stabilisers.

It has been found that the presence of a non-ionic stabiliser is particularly beneficial in giving the dispersions greater colloidal stability at neutral or basic pH. This can be important in the manufacture of coating compositions because it is often desirable to incorporate materials such as pigment dispersions which may be themselves basic and so can result in a final composition having a neutral or basic pH.

A non-ionic stabiliser comprises a non-ionic hydrophillic component and an anchor component which either is reacted onto the dispersed polymer by grafting or by copolymerization, or alternatively has a hydrophobic group which adsorbs onto the dispersed polymer.

The non-ionic hydrophillic component comprises a polymeric or oligomeric component which is itself water-soluble. Examples of suitable hydrophillic components are polyvinyl pyrrolidones of molecular weight 1000 to 10000 and ethylene oxide polymers or copolymers of molecular weight 200 to 10000. Preferably the hydrophillic component is a polymer or copolymer of ethylene oxide of molecular weight 200 to 10000, more preferably between 400 and 5000 and most preferably 1000 to 2500. Copolymers of ethylene oxide can also comprise minor proportions of copolymerized propylene oxide as long as there is sufficient ethylene oxide to give a water soluble polymer.

Examples of anchor components which can be covalently bonded onto the polymer are units derived from polymerisable unsaturated groups such as (meth)acrylate, or vinyl groups or graftable groups such as allyl groups. These units can be incorporated into the polymer when it is made for example by including a (meth)acrylate functional stabiliser precursor in the monomer mixture from which the polymer is produced.

A stabiliser precursor comprises the hydrophillic component covalently bonded to an unsaturated group which can be polymerised into the monomer mixture when the polymer is formed.

Examples of suitable stabiliser precursors are methoxy poly(ethylene oxide) methacrylate and the stabilisers derived from triallyl pentaerythritol disclosed in European patent EP-B-0 094 386, the disclosure of which is hereby incorporated by reference.

Anchor components which can be adsorbed onto the dispersed polymer include alkyl and alkyl-aryl groups. Preferably the anchor component has at least 6 carbon atoms and more preferably has at least 8 carbon atoms. Examples of suitable alkyl groups are $C_{8-20}$ alkyl such as octyl, nonyl, dodecyl, and lauryl. Examples of suitable alkyl-aryl groups are $C_{8-20}$ alkyl phenol and $C_{8-20}$ alkyl naphthol such as octyl phenol, nonyl phenol, lauryl phenol and nonyl naphthol groups.

Examples of stabilisers having anchor components that adsorb onto the dispersed polymer are nonyl phenol ethers of poly (ethylene oxide) of molecular weight 500 to 3000, preferably 1000 to 2500. One such stabiliser is Levelan P208 (trade mark) from Lankro Chemicals. Another example is the reaction product of Ocenol 110–130 (trademark of Henkel; mixture of oleic and linoleic alcohols) and 7 to 51 mols of ethylene oxide.

The amount of any non-ionic stabiliser in the dispersion should be such that the total dispersion comprises less than 40% by weight of hydrophillic polymer based on the total weight of the dispersion, preferably less than 20% and more preferably less than 7%.

The dispersions of the present invention are made by polymerising a mixture of vinyl monomers in the aqueous medium in the presence of the stabiliser including any additional non-ionic stabiliser, using free radical initiators, preferably grafting initiators.

Grafting initiators are free radical initiators which both cause free radical polymerisation of the monomer mixture so as to form the polymer dispersion and also abstract a hydrogen radical from the stabiliser so causing it to become grafted onto the dispersed polymer.

Examples of suitable grafting initiators are so-called redox initiators such as mixtures of hydrogen peroxide, cumene hydrogen peroxide, benzoyl peroxide or tertiary butyl hydrogen peroxide and a reducing agent such as ascorbic acid.

The presence of a ferrous salt is also advantageous in promoting grafting. Only trace amounts are required and often these are already present as impurities from the apparatus. When using glass apparatus, a small quantity of an iron salt such as ferrous sulphate can be added.

When the dispersion stabiliser is soluble in the aqueous medium, the dispersion is preferably made by first forming a solution of the stabiliser in the aqueous medium and then feeding in the monomers together with the initiator over a period of time and at a temperature at which polymerisation of the monomers and grafting of the stabiliser occur.

Typically the monomers can be fed into the aqueous medium over a period of 5 minutes to 5 hours, preferably over about 1 to 3 hours. Typically the process is carried out at a temperature of 30°–95° C., preferably 35°–85° C.

More preferably, the polymerisation can be carried out using what is called a seed-and feed (or semi-continuous) process in which a small quantity of the monomers is first fed into the solution of stabiliser and agitated or stirred to form a fine emulsion. Initiator is then added so as to polymerise the initial monomers to form a fine dispersion or seed. The rest of the monomers can then be fed in together with the rest of the initiator, and optionally further stabiliser. It is usually found that a seed-and-feed process gives rise to a finer and more monodisperse final polymer dispersion.

The polymerisation can also be carried out by forming a mixture of the dispersion stabiliser and the monomer mixture and then dispersing this in the aqueous medium. The initiator can then be added in one portion and the mixture heated so as to cause polymerisation and grafting so as to form the polymer dispersion.

In making the stabilisers, reaction between the epoxy functional resin and the amino silane can be carried out by mixing the two components together in a ratio of epoxy groups to amine groups of approximately 1:1 and heating the mixture to a temperature at which the components react together. Typically the reaction is carried out by heating the mixture to a temperature of 25°–90° C. for 1–5 hours. The reaction can be carried out in a suitable solvent which is a solvent which dissolves the components but which does not react with the epoxy or amine groups at the reaction temperature. An example of a suitable solvent is propylene glycol monomethyl ether.

When the epoxy functional resin is an addition polymer it can be made by conventional methods such as solution polymerisation.

When the addition polymer is made by solution polymerisation it can be made by dissolving the appropriate monomers in a suitable solvent, adding a suitable polymerisation initiator, such as azo-bis diisobUtyronitrile, and raising the temperature so that polymerisation occurs. Alternatively the monomer mixture together with the initiator can be added to a suitable solvent which is held at a suitable polymerisation temperature.

Suitable solvents include xylene, toluene and propylene glycol monomethyl ether. Preferably any solvent is water miscible.

The amine groups on the stabiliser can be protonated by contacting the stabiliser with acid. In order to contact the stabiliser with acid, a suitable acid can simply be added to the stabiliser. Alternatively, the stabiliser can be dissolved or dispersed in an aqueous solution of the acid.

Suitable acids include any acid which is not significantly detrimental to the final paint film. Examples of suitable acids are acetic, lactic, phosphoric and formic acids.

The amine groups on the stabiliser can be quaternised by reaction with an alkyl halide, such as methyl or ethyl chloride or bromide.

The coating composition can also comprise other conventional coating components such as pigments, fillers, thickeners, biocides and UV stabilisers.

The coating compositions of the invention can be used to form dried and/or cured coating films. According to the present invention there is provided a process for providing a cured coating on a substrate which comprises the steps of;

a) applying a layer of a coating composition as described above to the surface of a substrate, and b) causing or allowing the layer to cure.

The composition can be applied to the surface of a substrate by conventional means such as brushing, electrodeposition, rollercoating or spraying.

Suitable substrates include wood, steel, aluminium and glass. The coating compositions can also be applied over a previous coating such as an undercoat, primer or basecoat.

The layer can be cured either by allowing the aqueous medium to evaporate at ambient temperature or by heating, for example to 60°–90° C. for 10 minutes to 1 hour.

The invention is illustrated by the following examples;

EXAMPLES

Preparation of aqueous solutions of stabiliser.

For each of the aqueous stabilisers below, 15mg of the aqueous solution of stabiliser was diluted with 4.5 g water, allowed to stand for 3 minutes and then analyzed using a Malvern Autosizer 2c (Trade mark of Malvern Instruments). None of the stabilisers gave any particle size reading. This means that the stabilisers were all in aqueous solution. All of the aqueous solutions were made so as to contain 10% by weight of the stabiliser, except for Stabiliser 8 which was made into a 5% aqueous solution and Stabiliser 9 which was made into an 11.6% aqueous solution.

1. Stabilisers according to the invention 1.1 Preparation of Stabiliser 1

Epikote 880 (a bisphenol A/Epichlorohydrin type epoxy resin of epoxy equivalent weight 192; a trade mark of Shell Chemicals; 639 g, 1.7 mols) was stirred with N-methyl gamma-amino propyl trimethoxysilane (trade mark Dynasylan 1110 from Huls; 762 g, 3.8 mols) and Dowanol PM (propylene glycol monomethylether, a trademark of Dow Chemicals; 540 g) at 25° C. under nitrogen for 1 hour and then at 80° C. for two hours. The resulting mixture was cooled to 25° C. and a portion (535 g, 1 mol) was mixed with acetic acid (99 g, 1.6 mols), followed by slow addition of water (3035 g) over 5 minutes, with rapid stirring. The product was a clear aqueous solution of stabiliser.

1.2 Preparation of stabiliser 2

Epikote 880 (159 g, 0.41 mols) was stirred with gamma-amino propyl triethoxysilane (trade mark Al100 from OSi Specialties Inc.; 186 g, 0.84 mols) and Dowanol PM (140 g) at 25° C. under nitrogen for 1 hour and then at 80° C. for two hours. The resulting mixture was cooled to 25° C. and a portion (465 g) was mixed with acetic acid (90 g), and water (3126 g) was slowly added over 5 minutes, with rapid stirring. The product was a clear aqueous solution of stabiliser.

1.3 Preparation of Stabiliser 3

Epikote 880 (102 g, 0.265 mols) was stirred with gamma-amino propyl diethoxymethyl silane (trade mark Dynasylan 1505 from Huls; 110 g, 0.57 mols) and Dowanol PM (100 g) at 25° C. under nitrogen for 1.5 hours. The mixture was then heated to 50° C. for one hour, and then to 65° C. for a further hour. The resulting mixture was cooled to 25° C. and a portion (310 g) was mixed with acetic acid (50 g), and water (1758 g) was slowly added over 5 minutes, with rapid stirring. The product was a clear aqueous solution of stabiliser.

1.4 Preparation of stabiliser 4

XB 3083 (a saturated version of bisphenol A/Epichlorohydrin type epoxy resin of epoxy equivalent weight 198; a trade mark of Ciba Geigy Chemicals; 85 g, 0.21 mols) was stirred with N-methyl gamma-amino propyl trimethoxy silane (trade mark Dynasylan 1110 from Huls; 90 g, 0.45 mols) and Dowanol PM (92 g) at 25° C. under nitrogen for 1 hour and then at 65° C. for a further two hours. The mixture was cooled to 25° C. and a portion (267 g) was mixed with acetic acid (45 g), and water (1435 g) was slowly added over 5 minutes, with rapid stirring. The product was a clear aqueous solution of stabiliser.

1.5 Preparation of Stabiliser 5

Epikote 880 (139 g, 0.36 mols) was stirred with N-methyl gamma aminopropyl trimethoxy silane (trade mark Dynasylan 1110 from Huls; 74 g, 0.63 mols), gamma-mercapto propyl trimethoxysilane (trade mark A189 from OSi Specialties Inc.; 71 g, 0.36 mols) and Dowanol PM (140 g) under nitrogen for 10 minutes at 25° C. and then at 55° C. for two hours. The mixture was cooled to 25° C. and a portion (424 g) was mixed with acetic acid (72 g), and water (2366 g) was slowly added over 5 minutes, with rapid stirring. The product was a clear aqueous solution of stabiliser.

1.6 Preparation of Stabiliser 6

DEN438 (a phenol formaldehyde/Epichlorohydrin type epoxy resin of epoxy equivalent weight 185, a trade mark of Shell Chemicals; 114 g, 0.305 mols) was stirred with N-methyl gamma-aminopropyl trimethoxysilane (trade mark Dynasylan 1110 from Huls; 125 g, 0.63 mols), and Dowanol PM (200 g) under nitrogen for 10 minutes at 25° C. and then at 73° C. for two hours. The mixture was cooled to 25° C. and a portion (439 g) was mixed with acetic acid (52 g), and water (1860 g) was slowly added over 5 minutes, with rapid stirring. The product was a clear aqueous solution of stabiliser.

1.7 Preparation of Stabiliser 7

Epikote 880 (25 g, 0.065 mols) was stirred with amino bis(propyl trimethoxy silane) (trade mark A1170 from OSi Specialties Inc.; 45 g, 0.13 mols), and Dowanol PM (25 g) under nitrogen at 25° C. for 10 minutes and then at 73° C. for three hours. The mixture was cooled to 25° C. and a portion (95 g) was mixed with acetic acid (10 g), followed by slow addition of water (595 g) over 5 minutes, with rapid stirring. The product was an aqueous solution of stabiliser having a slight red tinge.

1.8 Preparation of Stabiliser 8

Epikote 1001 (a bisphenol A/Epichlorohydrin epoxy resin of epoxy equivalent weight 475, a trademark of Shell Chemicals; 200 g, 0.21 mols) was mixed with Dowanol PM (275 g) at 80° C. under nitrogen for thirty minutes. On cooling the solution to 40° C. N-methyl gamma-aminopropyltrimethoxysilane (Dynasylan 1110; 75 g, 0.39 mols) was added and the reactants were heated to 58° C. for 45 minutes. The mixture was cooled to 25° C. and a portion (220 g) was mixed with acetic acid (24 g). Water (1954 g) was slowly added over 5 minutes, with rapid stirring. The product was a slightly hazy aqueous solution of stabiliser.

1.9 Preparation of Stabiliser 9

A mixture of methyl methacrylate (322.5) butyl acrylate (127.5) glycidyl methacrylate (50 g) and azodiisobutyronitrile (25 g) was added to Dowanol PM (500 g) over two hours at 110° C. under nitrogen and was stirred at 110° C. for one hour. Azodiisobutyronitrile (5 g) was added and the mixture was stirred for two hours until the non-volatile content reached 50%. The mixture was cooled to room temperature. A portion of the product (500 g, containing 0.17 mols epoxy groups) was stirred with N-methylaminopropyltrimethoxy silane (Dynasylan 1110; 32.7 g, 0.17 mols) under nitrogen at room temperature for 10 minutes, then at 80° C. for 3 hours and finally it was allowed to cool to room temperature. The resulting stabiliser (123.7 g) was mixed with glacial acetic acid (3.7 g) and a 70% by non-volatile weight aqueous solution of a nonyl phenyl ether of poly (ethylene oxide) (available under the trademark Levelan p208 from Lankro chemicals; 6.4 g) followed by water (400 g) with vigorous stirring. This resulted in a clear aqueous solution of stabiliser. The stabiliser had a weight average molecular weight of 3653 as measured using gel permeation chromatography (GPC). A Waters (Trade mark) modular GPC system was used with a polystyrene standard and tetrahydrofuran as the eluting solvent.

2 Preparation of comparative stabilisers.

2.1 Comparative Stabiliser 1

Epikote 1001 (200 g, 0.21 mols) was stirred with diethanolamine (44 g, 0.42 mols) and Dowanol PM (244 g) at 80° C. under nitrogen for two hours. The resulting mixture was cooled to 25° C. and a portion (200 g) was mixed with acetic acid (25 g), and water (709 g) was slowly added over 5 minutes, with rapid stirring. The product was a clear aqueous solution of a stabiliser having no silane groups and having an Mn of 1038.

2.2 Comparative stabiliser 2

Phenyl glycidyl ether (a monofunctional epoxy compound; 60 g, 0.4 mols), was stirred with N-methylaminopropyl trimethoxy silane (80 g, 0.4 mols) at 25° C. under nitrogen for 10 minutes and then at 80° C. for two hours. The resulting mixture was cooled to 25° C. and a portion (48 g) was mixed with acetic acid (16 g), and water (416 g) was slowly added over 5 minutes, with rapid stirring. The product was a clear aqueous solution of stabiliser.

3. Preparation of poymer dispersions using the stabilisers.

In the following examples the stabilisers were used in the form of the aqueous solutions prepared in section 1 above.

3.1 Polymer Dispersion 1

A mixture of the aqueous Stabiliser 1 from 1.1 above (500 g), methylmethacrylate (20 g), and butyl acrylate (20 g) was heated to 40° C. under nitrogen with stirring for 15 minutes. A redox polymerisation initiator was added consisting of hydrogen peroxide (0.1 g; 100 vol. in 5 g of water) and ascorbic acid (0.1 g in 5 g of water). The mixture was stirred for a further 40 minutes at 40° C. so as to form a polymer seed.

The main monomer feed comprising Methylmethacrylate (153 g) and butyl acrylate (153 g) was added over three hours and simultaneously aqueous hydrogen peroxide (1.0 g (100 vol) in 68 g of water) and ascorbic acid (1 g in 76 g of water) were fed separately into the reactor. A mixture of hydrogen peroxide (0.1 g; 100 vol. in 5 g of water) and ascorbic acid (0.1 g in 5 g of water) were added and the mixture was held at 40° C. for another hour. The resulting acrylic polymer dispersion was allowed to cool and filtered.

3.2 Polymer Dispersion 2

Exactly the same procedure was followed to that used in 3.1 above to produce Polymer Dispersion 1 except that the 500 g of aqueous Stabiliser 1 was replaced by a mixture of 250 g of aqueous Stabiliser 1 and 250 g of water.

3.3 Polymer Dispersion 3

Exactly the same procedure was followed to that used in 3.1 above to produce Polymer Dispersion 1 except that the 500 g of aqueous Stabiliser 1 was replaced by a mixture of 125 g of aqueous Stabiliser 1 and 375 g of water.

3.4 Polymer Dispersion 4

Exactly the same procedure was followed to that used in 3.1 above to produce Polymer Dispersion 1 except that the 500 g of aqueous Stabiliser 1 was replaced by a mixture of 62.5 g of aqueous Stabiliser 1 and 437.5 g of water.

3.5 Polymer Dispersion 5

Exactly the same procedure was followed to that used in 3.2 above to produce Polymer Dispersion 2 except that a 60% aqueous solution of methoxy poly (ethylene oxide)methacrylate of molecular weight 2000 (17.34 g) was added after the seed stage and before the main monomer feed.

3.6 Polymer Dispersion 6

Exactly the same procedure was followed to that used in 3.2 above to produce Polymer Dispersion 2 except that a 60% aqueous solution of methoxy poly (ethylene oxide)methacrylate of molecular weight 2000 (34.7 g) was added after the seed stage and before the main monomer feed.

3.7 Polymer Dispersion 7

Exactly the same procedure was followed to that used in 3.2 above to produce Polymer Dispersion 2 except that a 60% aqueous solution of methoxy poly (ethylene oxide)methacrylate of molecular weight 2000 (65.4 g) was added after the seed stage and before the main monomer feed.

3.8 Polymer Dispersion 8

A mixture of aqueous Stabiliser 1 (250 g), water (170 g), methylmethacrylate (20 g), and butyl acrylate (20 g) was stirred at 40° C. under nitrogen for 15 minutes. A polymerisation initiator was added consisting of hydrogen peroxide (0.1 g (100 vol.) in 5 g of water) and ascorbic acid (0.1 g in 5 g of water) and the mixture was stirred for a further 40 minutes.

A mixture of methylmethacrylate (137 g), butyl acrylate (131 g), styrene (10.5 g), lauryl methacrylate (10.5 g), n-butyl methacrylate (12.5 g), 3-trimethoxysilyl propyl methacrylate (10.5 g) and N-(methylacryloxy-hydroxypropyl)-N-hydroxybutyl amino]ethyl-imidazolidinone (70% solution in isopropanol, as described in European patent EP 78 169; 18 g) were added over three hours. Simultaneously, aqueous hydrogen peroxide (1.0 g (100 vol) in 60 g of water) and ascorbic acid (1 g in 68 g of water) were fed in separately.

A mixture of hydrogen peroxide (0.1 g (100 vol.) in 5 g of water) and ascorbic acid (0.1 g in 5 g of water) was added and the mixture was stirred at 40° C. for another hour. The resulting acrylic polymer dispersion was allowed to cool and filtered.

3.9 Polymer Dispersion 9

A mixture of aqueous Stabiliser 1 (175 g), water (270 g) and vinyl acetate (40 g) was heated to 80° C. under nitrogen with stirring for 15 minutes. A polymerisation initiator was added consisting of hydrogen peroxide (0.1 g (100 vol.) in 5 g of water) and ascorbic acid (0.1 g in 5 g of water) and the mixture was stirred for a further 40 minutes.

Vinyl acetate (440 g) was added over three hours. Simultaneously, aqueous hydrogen peroxide (1.0 g (100 vol) in 60 g of water) and ascorbic acid (1 g in 68 g of water) were fed in separately.

A mixture of hydrogen peroxide (0.1 g (100 vol.) in 5 g of water) and ascorbic acid (0.1 g in 5 g of water) were added and the mixture was held at 80° C. for another hour. The resulting acrylic polymer dispersion was allowed to cool and filtered.

3.10 Polymer Dispersion 10

A mixture of aqueous Stabiliser 1 (125 g), water (85 g), methyl methacrylate (10 g), and butyl acrylate (10 g) was stirred at 40° C. under nitrogen for 15 minutes. A polymerisation initiator was added comprising hydrogen peroxide (0.05 g (100 vol.) in 2.5 g of water) and ascorbic acid (0.05 g in 2.5 g of water). The reaction was stirred for a further 40 minutes. A 60% aqueous solution of methoxy poly(ethylene oxide)methacrylate of molecular weight 2000 (34.68 g) was added.

A mixture of methylmethacrylate (77.5 g) and butyl acrylate (77.5 g) were added over three hours. Simultaneously, aqueous hydrogen peroxide (0.5 g (100 vol) in 30 g of water) and ascorbic acid (0.5 g in 34 g of water) were fed in separately. Hydrogen peroxide (0.05 g (100 vol.) in 2.5 g of water) and ascorbic acid (0.05 g in 2.5 g of water) were added and the mixture was held at 40° C. for another hour. The resulting acrylic polymer dispersion was allowed to cool and filtered. Aqueous ammonia solution (12.5%, 4 g) was added to the resulting polymer dispersion (100 g) so as to give a pH of the aqueous medium of 11.

3.11 Polymer Dispersion 11

The procedure used to produce Polymer Dispersion 1 was repeated but the 500 g of aqueous Stabiliser 1 was replaced by aqueous Stabiliser 8 (250 g) diluted with a further 250 g of water.

3.12 Polymer Dispersion 12

The procedure used to produce Polymer Dispersion 1 was repeated but the 500 g of aqueous Stabiliser 1 was replaced by aqueous Stabiliser 8 (60.5 g) further diluted with 439.5 g of water. Also, an aqueous solution of methoxy poly(ethylene oxide) of molecular weight 2000 (30 g) was added after the seed stage and before the main monmers were fed in. Aqueous ammonia solution (12.5%, 4 g) was added slowly to the resulting acrylic polymer dispersion (100 g) to change the pH of the aqueous medium to about 11.

3.13 Polymer Dispersion 13

A mixture of aqueous Stabiliser 1 (62.5 g), water (305 g), methyl methacrylate (20 g), and butyl acrylate (20 g) was stirred at 40° C. under nitrogen for 15 minutes. A polymerisation initiator was added comprising hydrogen peroxide (0.1 g (100 vol.) in 0.5 g of water) and ascorbic acid (0.1 g in 0.5 g of water). The mixture was stirred for a further 40 minutes. A 60% aqueous solution of methoxy poly(ethylene oxide)methacrylate of molecular weight 2000 (17.3 g) was added.

A mixture of methylmethacrylate (155 g) and butyl acrylate (153 g) were added over three hours. Simultaneously, aqueous hydrogen peroxide (1 g (100 vol) in 60 g of water) and ascorbic acid (1 g in 68 g of water) were fed in separately. A mixture of hydrogen peroxide (0.1 g (100 vol.) in 0.5 g of water) and ascorbic acid (0.1 g in 0.5 g of water) were added and the mixture was held at 40° C. for another hour. The resulting acrylic polymer dispersion was allowed to cool and filtered.

Aqueous ammonia solution (12.5%, 4 g) was added to the resulting polymer dispersion (100 g) so as to give a pH of the aqueous medium of 11.

3.14 Polymer dispersions 14 to 20

The following method was used to make Polymer dispersions 14 to 20. The stabiliser used in each case is listed in Table 1.

A mixture of Stabiliser (See Table 1; 400 g), methyl methacrylate (20 g), and butyl acrylate (20 g) was heated to 40° C. under nitrogen with stirring for 15 minutes. A polymerisation initiator was added consisting of hydrogen peroxide (0.1 g (100 vol.) in 3 g of water) and ascorbic acid (0.1 g in 3 g of water) and the mixture was stirred for a further 40 minutes at 40° C. A 60% aqueous solution of methoxy poly(ethylene oxide) methacrylate with a molecular weight of about 2000 (10 g) was added.

Methylmethacrylate (40 g) and butyl acrylate (40 g) were added over two hours at 40° C.. Simultaneously, aqueous hydrogen peroxide (0.3 g (100 vol) in 20 g of water) and ascorbic acid (0.3 g in 20 g of water) were fed in separately.

A mixture of hydrogen peroxide (0.1 g (100 vol.) in 3 g of water) and ascorbic acid (0.1 g in 3 g of water) were added and the reactants were held at 40° C. heated for an hour. The resulting acrylic polymer dispersion was allowed to cool and filtered.

TABLE 1

| Polymer Dispersion | Stabiliser |
| --- | --- |
| 14 | 1 |
| 15 | 2 |
| 16 | 3 |
| 17 | 4 |
| 18 | 5 |
| 19 | 6 |
| 20 | 7 |

3.15 Polymer Dispersions 21 to 23

The following method was used to make Polymer dispersions 21 to 23. The monomers used in each case are listed in Table 2.

Aqueous Stabiliser 1 (200 g) was mixed with the monomers (See Table 2), and the mixture was stirred at 40° C. for 15 minutes. A polymerisation initiator was added comprising aqueous hydrogen peroxide (0.1 g in 5 g of water) and Ascorbic acid (0.1 g in 5 g of water). The mixture was stirred at 40° C. for a further hour, the addition of initiators was repeated and the mixture was stirred for a further one and a half hours at 40° C.. The resulting polymer dispersion was allowed to cool to room temperature and filtered.

TABLE 2

| Dispersion | Methyl methacrylate | Butyl acrylate | Peg MA |
| --- | --- | --- | --- |
| 21 | 3.3 g | 3.3 g | 0 |
| 22 | 10.0 g | 10.0 g | 66.6 g |
| 23 | 6.2 g | 6.2 g | 12.7 g | pegMA = A 60% aqueous solution of methoxy poly(ethylene oxide) methacrylate of molecular weight 2000.

3.16 Polymer Dispersion 24

A mixture of aqueous Stabiliser 9 (533 g), methylmethacrylate (20 g) and butyl acrylate (20 g) was stirred at 40° C. under nitrogen for 15 minutes. A polymerisation initiator was added consisting of hydrogen peroxide (0.1 g (100 vol.) in 5 g of water) and ascorbic acid (0.1 g in 5 g of water). The mixture was stirred for a further 40 minutes at 40° C.

Methylmethacrylate (155 g), butyl acrylate (151 g), A174 (3.5 g, Union Carbide) and Levelan (14.6 g) were added over three hours. Simultaneously, aqueous hydrogen peroxide (1.0 g (100 vol) in 68 g of water) and ascorbic acid (1 g in 76 g of water) were fed in separately.

A mixture of hydrogen peroxide (0.1 g (100 vol.) in 5 g of water) and ascorbic acid (0.1 g in 5 g of water) were added and the mixture was heated for another hour. The resulting polymer dispersion was allowed to cool and filtered.

3.17 Polymer Dispersions

The following general method was used to produce polymer dispersions 25 to 29. The amounts of Stabiliser 1 and the monomers used in each case are given in Table 3 below.

A mixture of aqueous Stabiliser 1, methyl methacrylate, and butyl acrylate (See Table 3; Seed Stage, abbreviated to Stabiliser, MMA and BA) was stirred at 40° C. under nitrogen for 15 minutes. A polymerisation initiator was added consisting of hydrogen peroxide (0.1 g (100 vol.) in 5 g of water) and ascorbic acid (0.1 g in 5 g of water). The reaction was stirred for a further 40 minutes at 40° C.

Methylmethacrylate and butyl acrylate (MMA and BA; see table 3 Feed Stage) were added over three hours. An additional separate feed of Stabiliser 1 was added for Polymer dispersion 25 (S1 in table 3). Simultaneously, aqueous hydrogen peroxide (1.0 g (100 vol) in 60 g of water) and ascorbic acid (1 g in 60 g of water) were fed in separately.

A mixture of hydrogen peroxide (0.1 g (100 vol.) in 5 g of water) and ascorbic acid (0.1 g in 5 g of water) were heated for another hour. The resulting acrylic polymer dispersion was allowed to cool and filtered.

TABLE 3

| | Seed Stage | | | Feed Stage | | |
| --- | --- | --- | --- | --- | --- | --- |
| Dispersion | Stabiliser | MMA | BA | MMA | BA | S1 |
| 25 | 500 g | 16.8 g | 16.8 g | 179 g | 81.5 g | 380 |
| 26 | 670 g | 22.3 g | 22.3 g | 238 g | 108 | 0 |
| 27 | 631 g | 24.3 g | 24.3 g | 259 g | 117 | 0 |
| 28 | 439 g | 25.1 g | 25.1 g | 267 g | 121 | 0 |
| 29 | 335 g | 25.8 g | 25.8 g | 274 g | 124 | 0 |

50 g samples were centrifuged at 13000 rpm at 5° C. for 24 hours. A portion of the supernatant liquid (3 g) was examined for solids content by heating the sample in an oven for one hour at 150° C.. This experiment was used to calculate the amount of solution polymer grafted onto the latex particle. The results are given in Table 4.

TABLE 4

The amount of Stabiliser grafted onto the dispersion polymer.

| Dispersion | Total stabiliser | % Stabiliser grafted onto polymer |
| --- | --- | --- |
| 25 | 74 | 20.5 |
| 26 | 56 | 20.1 |
| 27 | 53 | 37.7 |
| 28 | 36.7 | 46 |
| 29 | 28 | 48 |

4. Comparative Polymer dispersions 4.1 Comparative Polymer Dispersion 1

An attempt was made to produce a polymer dispersion by the method used to produce Polymer Dispersion 1 but replacing aqueous Stabiliser 1 with aqueous Comparative Stabiliser 2. Comparative Stabiliser 2 is made from a monoepoxy compound and so has only one silane group. The attempt failed because the partially formed dispersion flocculated and precipitated out while the monomers were being fed in.

4.2 Comparative Polymer Dispersion 2

Comparative Polymer Dispersion 2 demonstrates the effect of using a silane free Comparative Stabiliser 1.

A mixture of aqueous Comparative Stabiliser 1 (500 g), methyl methacrylate (20 g), and butyl acrylate (20 g) was heated to 40° C. under nitrogen with stirring for 15 minutes. A polymerisation initiator was added consisting of hydrogen peroxide (0.1 g (100 vol.) in 5 g of water) and ascorbic acid (0.1 g in 5 g of water). The reaction was stirred for a further 40 minutes at 40° C.

A mixture of methylmethacrylate (155 g) and butyl acrylate (151 g) were slowly added over three hours. Simultaneously, aqueous hydrogen peroxide (1.0 g (100 vol) in 68 g of water) and ascorbic acid (1 g in 76 g of water) were fed in separately.

A mixture of hydrogen peroxide (0.1 g (100 vol.) in 5 g of water) and ascorbic acid (0.1 g in 5 g of water) were added and the mixture was heated for another hour. The resulting acrylic polymer dispersion was allowed to cool and filtered.

4.5 Comparative Polymer Dispersion 3 and 4

Examples 1 and 5 were repeated from the PPG Patent U.S. Pat. No. 5,118,752 to Chang et al as follows;

4.5.1 Comparative Polymer Dispersion 3; PPG Example 1

A mixture of Demodur W (Methylene biisocyanato cyclohexane; trademark of Mobay corporation; 140.4 g), DDI-1410 Diisocyanate (a dimer acid diisocyanate; trademark of the Henkel Corporation; 81.5 g), dimethylol propionic acid (43.9 g), Terethane 2000 (polyoxybutylene glycol; trademark of du Pont 65.5 g), Formrez 55–56 (neopentyl adipate; trademark of the Witco corporation; 65.5 g), N-methyl pyrrolidone (109.1 g) and dibutyl tin dilaurate (0.7 g) were stirred under nitrogen at 90° C. for 1.5 hours. Styrene (549.7 g) and butyl acrylate (137.4 g) were added and the mixture was cooled to 25° C. Dynasylan 1505 (3-aminopropyl methyl diethoxy silane; trademark of Huls Corporation; 52.5 g) was added slowly over 15 minutes. Triethylamine was then added. This mixture was added to a solution of ethylene diamine (7.4 g) in deionised water (1311.7 g). Ammonium persulphate (0.7 g) and sodium metabisulphite (0.7 g) were added and the mixture was stirred under nitrogen at 30° C. for 30 minutes. Sodium metabisulphite (0.7 g) was added and the mixture was stirred for 1.5 hours. The result was an aqueous dispersion of acrylic addition polymer.

4.5.2 Comparative Polymer Dispersion 4.; PPG Example 3

A mixture of Demodur W (Methylene bis-isocyanato cyclohexane; trademark of Mobay corporation; 140.4 g), DDI-1410 Diisocyanate (a dimer acid diisocyanate; trademark of the Henkel Corporation; 81.5 g), dimethylol propionic acid (43.9 g), Terethane 2000 (polyoxybutylene glycol; trademark of du Pont; 65.5 g), Formrez 55–56 (neopentyl adipate; trademark of the Witco corporation; 65.5 g), N-methyl pyrrolidone (108.3 g) and dibutyl tin dilaurate (0.7 g) were stirred under nitrogen at 90° C. for 1.5 hours. Styrene (570.9 g) and butyl acrylate (142.7 g) were added and the mixture was cooled to 25° C. Dynasylan 1505 (3-aminopropyl methyl diethoxy silane; trade mark of Huls Corporation; 52.5 g) was added slowly over 15 minutes. This mixture was added to a solution of ethylene diamine (4.4 g), ammonia (28% aqueous; 21.8 g) and t-butyl amino ethyl methacrylate in deionised water (1385.5 g). Ammonium persulphate (1.1 g) and sodium metabisulphite (1.1 g) were added and the mixture was stirred for 1.5 hours. The result was an aqueous dispersion of acrylic addition polymer.

5. Test Results 5.1 Storage Stability

Samples of each of the polymer dispersions were kept in glass jars at ambient temperatures and were inspected at regular intervals. All of polymer Dispersions 1 to 25 above according to the invention were storage stable for at least three months. By storage stable is meant that the compositions showed no significant deterioration in the properties of films formed from them compared with films formed from freshly prepared compositions.

In contrast, both Comparative Dispersions 3 and 4 (According to U.S. Pat. No. 5,118,752) showed very significant deterioration in film properties after only 11 weeks storage. Thus these Comparative Dispersions were unacceptable for storage stability.

5.2 Film Formation at ambient temperatures.

Samples of each of the compositions listed below were applied as thin films to the surface of glass panels by means of a block spreader. The films were applied so as to give a final dry film thickness of about 50 microns. The films were allowed to dry at ambient temperature over night and were then tested as outlined below.

a) Pencil Test

Deionised water was placed on the film to be tested. The water was left in contact with the film for 1 hour and the wiped off with a soft cloth so as to give a dry surface. A 6B pencil was rubbed across the previously wetted area of the film once in each direction using an Erichsen Pencil Hardness Tester (Available from the Erichsen Company of Germany) with a body weight of 684 g.

The films ware rated as a fail (F) if the pencil penetrated through the film at any point, and a Pass (P) if no penetration occurred.

b) Softness and Stain Tests.

The surface of the film was wetted with deionised water for 1 hour. The water was wiped off with a soft cloth so as to leave a dry surface. The film was visually compared with the unwetted portion of film and evaluated for staining as follows; A=No Change; B=Slight Haze; C=Film Very Cloudy; D=Film Opaque, E=Film Disintegrated.

An attempt was made to scratch the surface of the film with a finger nail and its softness was rated and compared with the unwetted portion of film as follows; A=No Change; B=Slight softening; C=Nail Made permanent impression; D=Film Lifted From the Glass.

c) MEK Rubs Test.

The surface of the film was rubbed back and forth with a rag soaked in methyl ethyl ketone. A single back and forth rub counted as one rub. The number of rubs required to expose any of the substrate was noted. The test was ended at 200 rubs.

The following tables group the compositions so as to show the variation in film performance with variations in the composition of the polymer dispersion. In particular, they show the effect of different stabiliser types, different stabiliser levels, different polymer compositions, and different levels of non-ionic stabiliser.

The results of the Pencil Test, Softness Test, Stain Test and MEK Rubs Test are listed under Pencil, Soft, Stain and MEK respectively in the results tables below. In the tables the monomers methyl methacrylate, butyl acrylate and poly (ethylene oxide)methacrylate of molecular weight 2000 are sometimes abbreviated to MMA, BA and peg MA respectively. The percentages given are by non-volatile weight based on the total weight of the monomers, including any peg MA, and the Stabiliser.

Table 5 shows the effect of stabiliser level on film properties. All of the Polymer Dispersions comprise Stabiliser 1 and a 50/50 methyl methacrylate/butyl acrylate copolymer unless otherwise indicated. The results from dispersion 10 show the very small effect on film properties of adding 10% by weight of additional non-ionic stabiliser which allows the pH to be raised to 11 without any instability problems. The results from Dispersion 11 show the effect of using Stabiliser 8 based on Epikote 1001 rather than Stabiliser 1 which is based on Epikote 880.

TABLE 5

| Dispersion | % Stabiliser | Soft | Stain | Pencil | MEK |
| --- | --- | --- | --- | --- | --- |
| 1 | 12.6 | A | A | P | 200 |
| 2 | 6.5 | A | C | P | 200 |
| 3 | 3.5 | C | A | P | 33 |
| 4 | 1.7 | C | A | P | 23 |
| 21 | 75 | B | D | F | 200 |
| 10 | 6 | B | B | P | 144 |
| 11 | 3.5 | A | B | P | 96 |

TABLE 6

Table 6 shows the effect of adding various levels of peg MA to the compositions of Dispersion 1 during polymerisation.

| Dispersion | % peg MA | Soft | Stain | Pencil | MEK |
| --- | --- | --- | --- | --- | --- |
| 5 | 3 | C | A | P | 101 |
| 6 | 6 | B | C | P | 103 |
| 7 | 12 | C | B | F | 115 |
| 7* | 12 | B | A | P | 180 |

*Heated to 60° C. for 30 minutes.

TABLE 7

Table 7 shows the effect of varying the epoxy component of the stabiliser. All of these dispersions comprise a 50/50 MMA/BA copolymer with 3.6% of peg MA and 24.1% Stabiliser. The stabilisers comprise N-methylaminopropyl trimethoxy silane reacted with different epoxy resins.

| Dispersion | Stabiliser | Soft | Stain | Pencil | MEK |
|---|---|---|---|---|---|
| 14 | 1 | B | A | P | 200 |
| 17 | 4 | C | A | P | 120 |
| 19 | 6 | B | B | P | 133 |

TABLE 8

Table 8 shows the effect of varying the amine component of the stabiliser. All of these dispersions comprise a 50/50 MMA/BA copolymer with 3.6% peg MA and 24.1% of Stabiliser. The stabilisers comprise Epikote 880 reacted with different amines.

| Dispersion. | Stabiliser | Soft | Stain | Pencil | MEK |
|---|---|---|---|---|---|
| 15 | 2 | B | A | P | 149 |
| 16 | 3 | A | A | P | 200 |
| 18 | 5 | A | A | P | 194 |
| 20 | 7 | A | A | P | — |

TABLE 9

Table 9 illustrates the properties of some of the other polymer dispersions.

| Dispersion | Stabiliser (%) | Soft | Stain | Pencil | MEK |
|---|---|---|---|---|---|
| 8 | 1 (6.5) | A | A | P | 194 |
| 9 | 1 (3.5) | A | A | P | 80 |
| 24 | 9 (14.5) +3% peg MA | A | A | P | 138 |

TABLE 10

Table 10 illustrates that high levels of non-ionic stabiliser give rise to poor properties in the final films. The polymer dispersions are both made using a 50/50 MMA/BA mixture and using Stabiliser 1.

| Dispersion | % Stab. | % pegMA | Soft | Stain | Pencil | MEK |
|---|---|---|---|---|---|---|
| 21 | 25 | 50 | D | D | F | 42 |
| 22 | 50 | 19 | D | D | F | 200 |

5.3 Early water resistance at ambient temperatures.

A 200 μm thick film of various dispersions was cast over 15 cm×10 cm black Lenta panels (Lenta is a trade mark of The Lenta Co. U.S.A.). The films were allowed to dry for 105 minutes at 23° C. Each panel was partially immersed into a water bath at 20° C. such that about a third of the panel was covered by the water. The panels were inspected after 5 minutes and after 90 minutes of partial immersion. The panels were inspected for discolouration, blistering, softness, and recovery and were rated as follows;

Discolouring; None, White.

Blisters; None, Few, Numerous.

Softness; Fingernail scratch compared to the unimmersed portion; No Change, Slightly Softer, Softer.

Recovery; Had all of these properties recovered to be the same as the unimmersed portion of the film after 5 minutes drying in air at 23° C.?; Yes, No.

The results after 5 minutes immersion are given in Table 11, and the results after 90 minutes immersion are given in Table 12.

TABLE 11

| Dispersion | Discolour. | Blisters | Softness | Recovery |
|---|---|---|---|---|
| 1 | None | None | No Change | — |
| 2 | None | None | No Change | — |
| 5 | None | None | No Change | — |
| 6 | None | None | No Change | — |
| 8 | None | Few | Slightly Softer | Yes |
| Comp. 3* | White** | Numerous | Softer | No |
| Comp. 4* | White** | None | Softer | No |

*Did not form a glossy film but crazed.
**Discoloured within 1 minute of immersion.

TABLE 12

| Dispersion | Discolour. | Blisters | Softness | Recovery |
|---|---|---|---|---|
| 1 | None | None | No Change | — |
| 2 | None | None | No Change | — |
| 5 | None | None | No Change | — |
| 6 | None | None | No Change | — |
| Comp. 4* | White | None | Softer | No |

*Did not form a glossy film but crazed.

5.3 Film formation at 80° C.

A sample of each of Polymer Dispersions 24 to 28 (10 g) was mixed with butyl cellosolve (2.5 g) applied to a metal panel using a block spreader and the heated to 80° C. for minutes. All the dispersions were made with Stabiliser 1. The tests are those given above in 5.2. The test results are shown in Table 13.

TABLE 13

| Dispersion | % Stabiliser | Soft | Stain | Pencil | MEK |
|---|---|---|---|---|---|
| 24 | 20.1 | A | A | P | 200 |
| 25 | 14.5 | A | A | P | 200 |
| 26 | 12.6 | A | A | P | 200 |
| 27 | 7.8 | A | A | P | 200 |
| 28 | 6.5 | A | A | P | 200 |

5.4 Comparative examples

The results of testing the comparative dispersions 2 to 4 are shown in Table 14.

TABLE 14

| Dispersion | % Stabiliser | Soft | Stain | Pencil | MEK |
|---|---|---|---|---|---|
| 2 | 12.5 | D | D | F | 24 |
| 3 | 39.9 | B | C | F | 200 |
| 4 | 40.5 | C | C | F | 149 |

We claim:

1. A coating composition which comprises a dispersion in an aqueous medium of a dispersed vinyl polymer which is stabilised in dispersion by a stabiliser which is an epoxy resin which has at least two hydrolysable silane groups and at least one protonated or quaternised amine group.

2. A composition according to claim 1 in which the hydrolysable silane groups are of the formula;

$$-Si(R^1)_a R_{3-a}$$

in which a is 1 to 3, R is $C_{1-6}$ alkyl and $R^1$ is OH or a hydrolysable group.

3. A composition according to claim 2 in which a is 2 or 3, R is methyl or ethyl and $R^1$ is methoxy or ethoxy.

4. A composition according to claim 1 in which the amine group is a protonated tertiary amine group.

5. A composition according to claim 1 in which the stabiliser is the protonated or quaternised reaction product of an epoxy functional resin and an aminosilane.

6. A composition according to claim 5 in which the epoxy functional resin is of the formula;

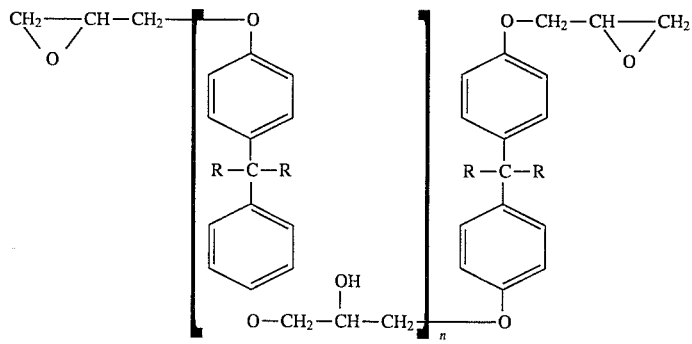

where R is H or alkyl and n is, on average, 0 to 3.

7. A composition according to claim 6 in which the epoxy functional resin has an epoxy equivalent weight of 150 to 500.

8. A composition according to claim 1 in which the stabiliser is present in an amount of at least 1% by weight.

9. A composition according to claim 1 in which a fraction of the stabiliser is covalently bonded onto the polymer.

10. A composition as claimed in claim 9 in which the stabiliser is covalently bonded by grafting.

11. A composition according to claim 9 in which between 10 and 60% by weight of the stabiliser is covalently bonded onto the polymer.

* * * * *